United States Patent [19]

Ninomiya et al.

[11] Patent Number: 4,845,641

[45] Date of Patent: Jul. 4, 1989

[54] METHOD OF FORMING A SYNTHETIC IMAGE IN SIMULATION SYSTEM FOR ATTACHMENT OF SPECTACLES

[75] Inventors: Noboru Ninomiya, Ome; Osamu Hagiwara, Fuchu; Toshira Yoda, Fussa, all of Japan

[73] Assignee: Hoya Corporation, Tokyo, Japan

[21] Appl. No.: 98,290

[22] Filed: Sep. 18, 1987

[30] Foreign Application Priority Data

Sep. 19, 1986 [JP] Japan .................................. 61-221039
Jan. 12, 1987 [JP] Japan .................................... 62-4398

[51] Int. Cl.$^4$ .......................... G06F 15/62; H04N 7/18
[52] U.S. Cl. ...................................... 364/518; 358/93; 364/521
[58] Field of Search ............... 364/518, 521, 525, 578; 358/93, 183

[56] References Cited

U.S. PATENT DOCUMENTS

| | | | |
|---|---|---|---|
| 4,297,724 | 10/1981 | Masuda et al. | 358/93 |
| 4,539,585 | 9/1985 | Spackova et al. | 358/93 |
| 4,730,260 | 3/1988 | Mori et al. | 364/518 |
| 4,731,743 | 3/1988 | Blancato | 364/521 |

Primary Examiner—Felix D. Gruber
Attorney, Agent, or Firm—Henry Sternberg; Bert Lewen

[57] ABSTRACT

A method of making a synthetic image in a simulation system for attachment of spectacles, in which a synthetic image of image pickup data of a spectacles frame taken in at a first magnification and image pickup data of a person's image derived from an imaging apparatus is made by a computer, and a state in which the person wears a pair of spectacles is displayed by a display apparatus, characterized by the steps of: calculating a second magnification to an actual person of the display image on a display screen on the basis of the coordinates of the positions of the apexes of the corneas of both of the right and left eyes which are detected from a still image on the display screen of a person who does not wear a pair of spectacles which is picked up by the imaging apparatus and is transmitted to the computer and on the basis of the information of the distance between the pupils of the person which is input from the computer; calculating the spectacles frame synthetic position on the display screen and a third synthetic magnification of the person's image and spectacles frame image on the basis of the second magnification; and displaying the synthetic image of the person and spectacles frame by the display apparatus.

2 Claims, 8 Drawing Sheets $$\ell = \frac{V \times t}{2}$$

V = SOUND VELOCITY

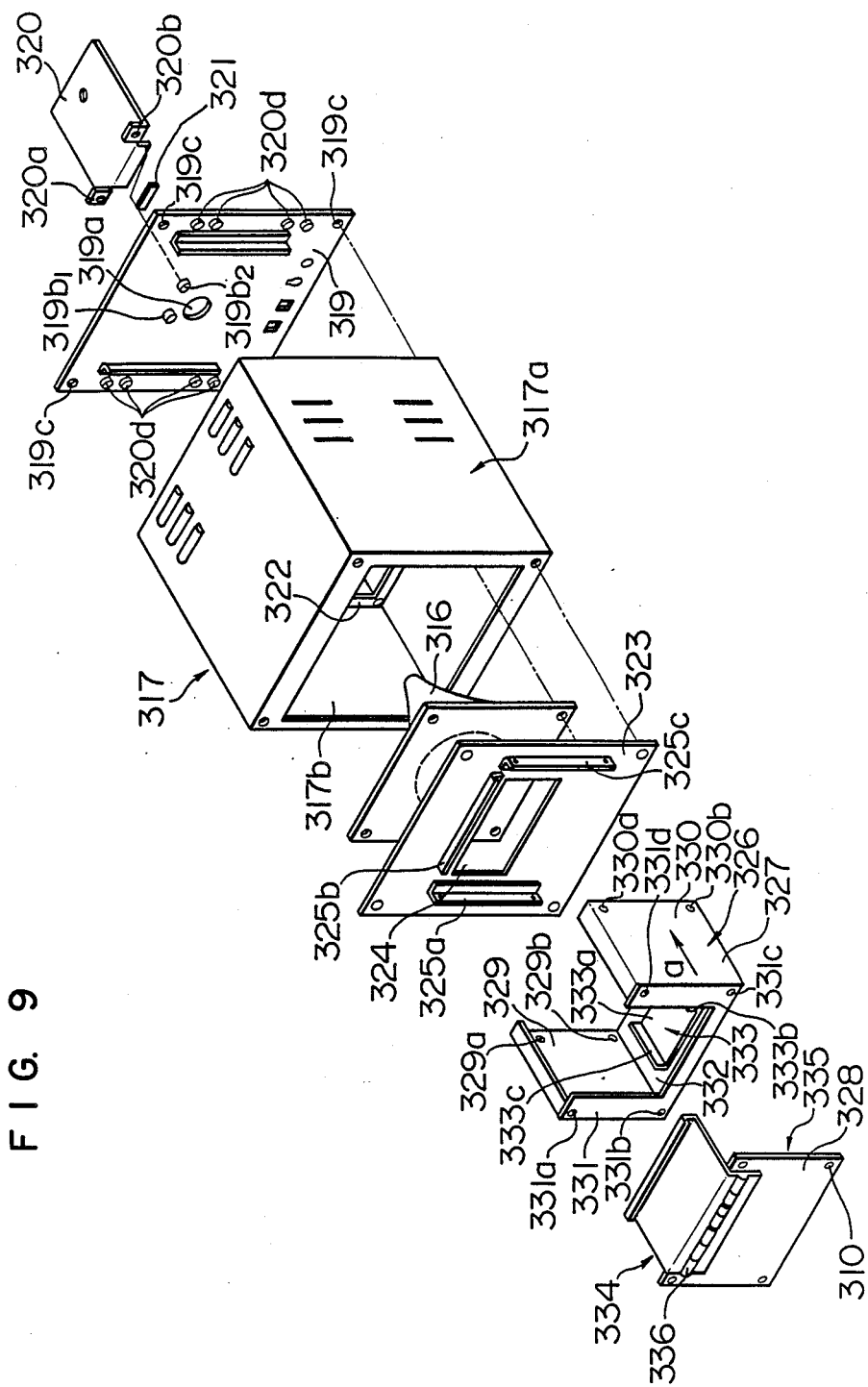

METHOD OF FORMING A SYNTHETIC IMAGE IN SIMULATION SYSTEM FOR ATTACHMENT OF SPECTACLES

BACKGROUND OF THE INVENTION

The present invention relates to a method of forming a synthetic image in a simulation system for attachment of spectacles. Namely, the invention relates to a method of forming a synthetic image in a simulation system for spectacles by making an image of a person as if wearing a given pair of spectacles from an image of a person not wearing a pair of spectacles and by displaying the synthetic image to enable the person to try on and select a new pair of spectacles.

Currently, when a person desires to buy a pair of spectacles at a place where they are sold, in order to see the state or appearance of his face with the frame of the spectacles in place, in the case of selecting a desired frame of spectacles not containing prescription lenses, he directly tries on a given frame of a pair of spectacles not containing lenses, and observes his face reflected by a mirror.

However, in the case of persons of strong near-sightedness, astigmia, or the like, the image becomes dim even at a position which is fairly close to the mirror when the person removes his own spectacles to try on just the frame of a new pair of spectacles to be selected. Therefore, such a person cannot correctly know the state of his face when he wears only the frame of the spectacles. To solve this drawback, as a simulation system for attachment of spectacles in which the state of the face as if wearing spectacles can be known, a system disclosed in U.S. Pat. No. 4,730,260 to Mori et al, corresponding to JP-A-61-80222, has been proposed. This method uses the image synthesis processing technique. An image of a person who has removed his own spectacles is picked up by a video camera. An image pickup signal of this person's image is A/D converted into a digital signal. This digital signal is stored into an image memory device. A display signal which is derived by synthesizing the data of the person's image stored in the image memory device and the data of a frame of spectacles to be selected is formed. The state in which this person wears the spectacles is displayed by the display apparatus, thereby allowing a preferable pair of spectacles to be selected.

In this system, when a person's image is stored, the person's image picked up by the video camera is displayed by the display apparatus and the video camera is operated such that the face of the person comes to the position at which the frame of the spectacles will be displayed and thereafter, a person's image as if wearing the spectacles is picked up.

This is because when the image of the frame of the spectacles is made, if its size, position, and angle are preliminarily fixed, it is sufficient to use a computer having a small capability. Therefore, a square frame indicative of the position of the frame of the spectacles is displayed by the display apparatus. The display signal of this square frame and the image pickup signal from the video camera are synthesized and displayed. The video camera is moved while observing the display image in a manner such that the portion of the face on which a pair of spectacles is arranged by simulation just enters this square frame. Thereafter, the person's image as if wearing the spectacles is picked up by the video camera. By this method, there is no need to correct the data of the frame of the spectacles in accordance with the size, position, and inclination of the face. It is sufficient to provide a computer of small capability.

Further, according to this method, the data of the frame of the spectacles is transferred to the image memory device from another memory device and synthesized.

An image of a person whose spectacles have been removed is picked up. The person who uses a pair of spectacles to correct eyesight removes the spectacles and observes the display image on the display apparatus. In this case, he cannot clearly observe the image because the image becomes dim. Thus, the person cannot match the frame of the spectacles with his face on the display apparatus by himself.

On the other hand, even in the case of a person whose eyesight is relatively good, when he looks at the image of the display apparatus while facing generally toward the video camera, since the video camera and the display apparatus are not arranged at the same position, his face will have been picked up in a state in which the direction of the line of sight is not in front of the video camera.

Further, in general, when a person faces in front of the camera or the like and is photographed in this state, his face is not horizontally still but has a tendency such that the face is slightly inclined to the right or left. Therefore, when the synthesized image is displayed by the apparatus to match spectacles, even if the size or position (inclination) of the frame of the spectacles is slightly deviated, i.e. slightly rotated or moved, the person feels a physical disorder. The display image may fairly differ from the image which is derived when the person puts on the actual frame of the spectacles. It is difficult to display an accurate synthetic image of the person's image and the frame image of the spectacles.

Further, according to the method disclosed in said U.S. Pat. No. 4,730,260, since the person's image must be correctly displayed within a range of the designated screen, in order to pick up an image of a person, the video camera must be moved to match the size and position of the person's image. Thus, another person who photographs a person's image or a remote controller capable of adjusting the photographing position and angle and the like is necessary.

Namely, in order to insert the face whose image is picked up into the range of the frame at the position of the frame of the spectacles on the screen of the display apparatus, the size of the face must be made coincident with the fixed position on the display screen.

For this purpose, it is necessary to perform correct and fine adjustments such as to move the photographing means such as a video camera or the like back and forth or to the right and left, or the like. Its adjusting work is complicated and it takes extra time to adjust.

SUMMARY OF THE INVENTION

The present invention is provided to eliminate the foregoing drawbacks. It is the first object of the invention to enable a person's image having a natural expression to be picked up by a camera without needing the adjustment of the correct position of an object to be photographed, the adjustment of the inclination of the portion of both eyes to the horizontal line of the display screen, and the matching of the size of the fixed screen with the size of the person to be photographed. It is the second object of the invention to accurately synthesize the position, inclination, and size of the image of the frame of the spectacles with a person's image.

The first embodiment according to the present invention provides a method of making a synthetic image in a simulation system for attachment of spectacles which comprises: a computer having a CPU, an A/D converter, an image memory, a D/A converter, a memory of spectacles frame data taken in at a first magnification, a program memory, and operating means; an imaging apparatus; and a display apparatus, and in which a synthetic image of the image pickup data of the spectacles frame taken in at the first magnification and the image pickup data of a person's image derived from the imaging apparatus is made by the computer, and a state in which the person wears a pair of spectacles is displayed by the display apparatus, wherein this method is characterized by the steps of: calculating a second magnification of the display image on the display screen of an actual person, on the basis of the coordinates of the positions of the apexes of the corneas of both of the right and left eyes which are detected from a still image on the display screen of a person who does not wear a pair of spectacles which is picked up by the imaging apparatus, and is transmitted to the computer and on the basis of the information of the distance between the pupils of the person which is input from the operating means of the computer; calculating the spectacles frame synthetic position on the display screen and a third synthetic magnification of the person's image and spectacles frame image on the basis of the second magnification; and displaying the synthetic image of the person and spectacles frame by the display apparatus.

The simulation system for attachment of spectacles comprises: a computer having a CPU, an A/D converter, an image memory, a D/A converter, a spectacles frame data memory taken in at the first magnification, a program memory, and operating means; an imaging apparatus; and a display apparatus. An image of a person is picked up by the imaging apparatus in the state in which the person does not wear spectacles. Therefore, it is sufficient that the person spectacles is picked up while the person merely observes a target, and there is no need to pay attention to the position and inclination of the face.

The image pickup signal of the person's image is transmitted through the A/D converter and stored into the image memory. This image pickup signal is then supplied through the D/A converter and displayed as a still image by the display apparatus. From this display image, the coordinates $(X_L, Y_L)$ and $(X_R, Y_R)$ of the apexes of the corneas of both of the left and right eyes are detected on the basis of the number of dots in the X and Y directions. The inclination $\theta$ to the X direction (horizontal direction) of the display apparatus of the straight line connecting the positions of the apexes of the corneas of the left and right eyes is obtained by the following equation from those coordinate data.

$$\theta = \tan^{-1}\left(\frac{Y_R - Y_L}{X_R - X_L}\right) \quad (1)$$

Thus, the angles of inclination of both eyes are calculated. From the middle point (central coordinates) $(X_0, Y_0)$ of the coordinates of the positions of the apexes of the corneas of the left and right eyes, the rotational central reference of the frame to rotate the synthetic image of the frame image can be obtained. The central coordinates are calculated as follows.

$$X_0 = \frac{X_R + X_L}{2}, \quad Y_0 = \frac{Y_R + Y_L}{2} \quad (2)$$

The actual measured value of the distance between the pupils (hereinbelow, referred to as the IPD) is input from the keyboard. Therefore, from this value of IPD and the coordinates of the apexes of the corneas, a take-in magnification $(m_I)$ of the person's image, i.e. the second magnification is obtained by the ratio of the actual value of the IPD and the distance between both of the right and left eyes of the display screen as follows.

$$m_1 = \frac{IPD}{\sqrt{(X_R - X_L)^2 + (Y_R - Y_L)^2}} \quad (3)$$

A synthetic magnification (m) to make a synthetic image of the person and the frame, i.e. the third synthetic magnification is calculated by the following equation since a take-in magnification $(K_F \text{[mm/dot]})$ of the frame data, i.e. the first magnification, has been preliminarily calculated as a fixed value.

$$m = \frac{IPD}{\sqrt{(X_R - X_L)^2 + (Y_R - Y_L)^2}} \cdot \frac{1}{K_F} \quad (4)$$

Therefore, since the equations (1) to (4) have been previously programmed and stored in the program memory, the frame synthetic magnification and synthetic position to make the synthetic image of the person and the frame can be calculated by the CPU, spectacles frame data memory, and program memory. The synthetic image data of the frame and the person is produced and transmitted through the D/A converter, so that the synthetic image of the frame and the person is displayed by the display apparatus.

Therefore, since the image can be accurately synthesized in accordance with an arbitrary screen size, a person's image can be picked up at the screen size in accordance with the purpose of use. On the other hand, since the spectacles frame can be synthesized at the correct position, size, and inclination, the difference of the impression between the synthesized person's image with spectacles and the state in which the person wears the actual frame can be reduced.

The second embodiment according to the present invention provides a method of forming a synthetic image in a simulation system for attachment of spectacles which comprises: a computer having a CPU, an A/D converter, an image memory, a D/A converter, a frame data memory of spectacles frame data taken in at a first magnification, a program memory, and operating means; an imaging apparatus, a display apparatus; and distance measuring means, and in which a synthetic image of the image pickup data of the spectacles frame taken in at the first magnification and the image pickup data of a person's image derived from the imaging apparatus is made by the computer, and a state in which the person wears a pair of spectacles is displayed by the display apparatus, wherein this method is characterized by the steps of: calculating a second magnification of the display image on the display screen of an actual person, on the basis of the coordinates of the positions of the apexes of the corneas of both of the right and left eyes which are detected from a still image on the display screen of a person who does not wear a pair of spectacles which is picked up by the imaging apparatus and is transmitted to the computer, and on the basis of the information of the distance between the person and the imaging apparatus which was measured by the distance measuring means; calculating the spectacles frame synthetic position on the display screen and a third synthetic magnification of the person's image and spectacles frame image on the basis of the second magnification; and displaying the synthetic image of the person and spectacles frame by the display apparatus.

The second embodiment differs from the first embodiment in that the information of the distance between the person and the imaging apparatus which is measured by the distance measuring means is used in place of the information of the distance between the pupils of the person which is input on the basis of the data externally derived from interpupillary distance (IPD) measurement.

On the basis of the distance (l) between the person and the imaging apparatus which was measured by the distance measuring means and the distance (L; which is not shown in the figures) between the frame and the imaging apparatus which has previously been calculated as a fixed value when the frame data is taken in, the synthetic magnification (m) to make the synthetic image of the person and the frame is calculated by the following equation.

$$m = L/l \tag{5}$$

Therefore, the first and second embodiments are similarly constituted up to the point where the equations (1) and (2) are obtained. In the case of the second embodiment, the programming is thereafter performed per the equations (1), (2), (5) and the subsequent constitution is similar to that of the first embodiment.

BRIEF DESCRIPTION OF THE DRAWINGS

FIG. 9 is an exploded view of the spectacles frame photographing apparatus in this embodiment.

DESCRIPTION OF THE PREFERRED EMBODIMENTS (Embodiment 1)

Figure 1:
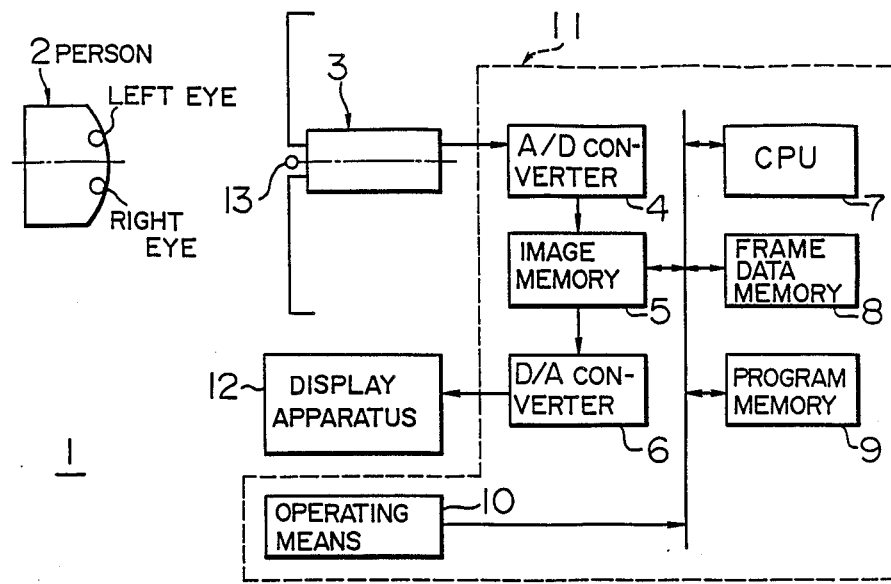
FIG. 1 is a diagram for explaining a constitution of a spectacles simulation system in the embodiment 1.

In FIG. 1, a simulation system for attachment of spectacles (hereinafter, referred to as a main system) 1 comprises: a video camera 3 to pick up an image of a person 2; a computer unit 11; and a display apparatus 12.

The computer unit 11 comprises: an A/D converter 4; an image memory 5; a D/A converter 6; a CPU 7; a frame data memory 8; a program memory 9; and operating means 10.

The video camera 3 is used as an imaging apparatus to pick up the image of a person who does not wear spectacles. When the person 2 is photographed, the video camera 3 allows the face to be directed in a predetermined direction and allows the person 2 to observe a preset target 13.

In this case, it is a prerequisite that the person does not wear a pair of spectacles. The foregoing target or the like can be arbitrarily set. It is preferable to pick up an image in the ordinary natural relaxed condition. The imaging apparatus is not limited to a video camera but another imaging apparatus such as an image scanner or the like can be also used.

Figure 2:
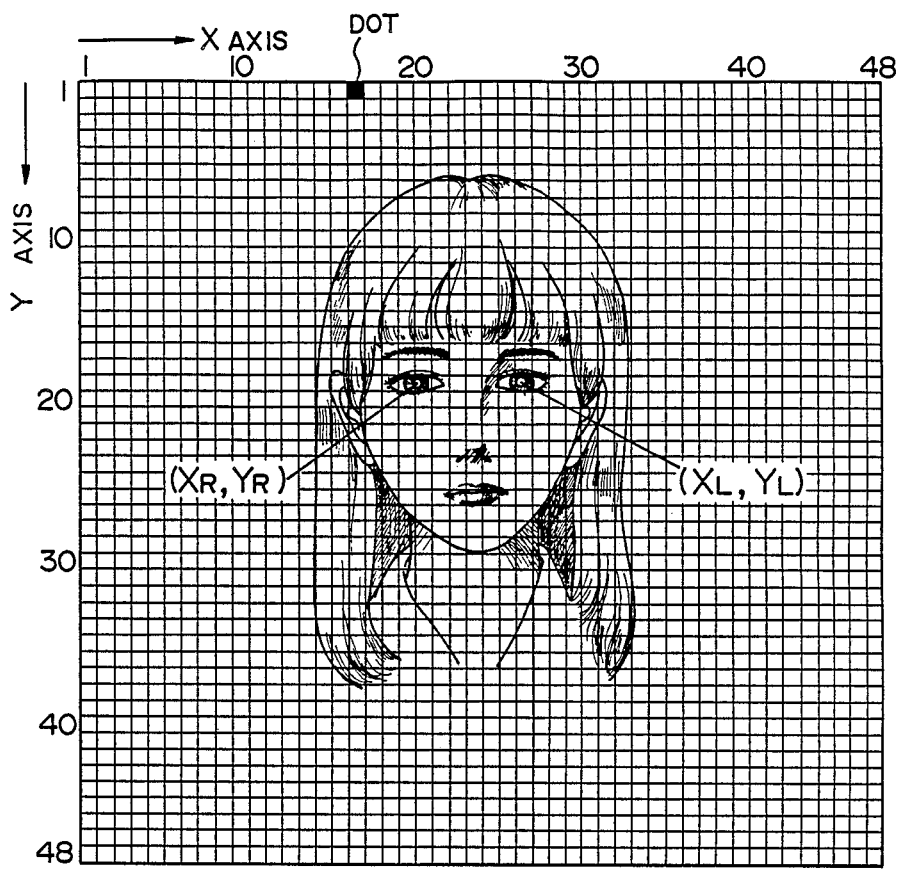
FIG. 2 is a partial enlarged diagram of the screen of a display apparatus in this embodiment.

Next, an image pickup signal from the video camera 3 as the image input apparatus is stored into the image memory 5. Namely, the image pickup signal of the person's image is further transmitted through the A/D converter 4 and stored into the image memory 5. The data stored in the image memory 5 in this manner is transmitted through the D/A converter 6 and displayed as a still image by the display apparatus 12. (Refer to FIG. 2.)

The coordinates $(X_R, Y_R)$ and $(X_L, Y_L)$ of the positions of the apexes of the corneas of the right and left eyes are detected from the operating means 10. Further, from the image, the actual measured information of the distance between the pupils of the person 2 is input from the operating means 10. By obtaining the image take-in information of the person as the image, the synthetic image data of the person's image and the spectacles frame is produced by the image memory 5, CPU 7, frame data memory 8, and program memory 9. This data is transmitted through the D/A converter 6 and the synthetic image is displayed by the display apparatus 12.

A system of a computer in which the constitution and mechanism of the mechanical apparatuses are well known is used with respect to the video camera 3, computer unit 11, and display apparatus 12 in the foregoing embodiment. The D/A conversion and A/D conversion of the image pickup signal until it is transmitted through the computer and displayed by the display apparatus are well known. The image display apparatus and its principle and theory are also well known. These D/A and A/D conversions and the display of the image signal are embodied by use of well-known image processing techniques.

Therefore, the data of three colors such as RGB or a video signal based on the NTSC standard or the like may be also used as the data which is stored into the image memory 5. The CPU 7 performs the arithmetic operating processes. The frame image is preliminarily picked up at a predetermined take-in magnification, i.e. the first magnification, by the video camera and the resultant frame data is initially stored in the frame data memory 8. The image pickup signal of the video camera is transmitted through the A/D converter and converted into a digital signal. This digital signal is stored into the image memory. The image data is stored as numerical data into a floppy disk or the like. This floppy disk is used as a frame data memory. The frame data is read out of this memory as necessary.

The processing techniques for writing, reading, or the like of the frame image pickup data into or from the memory device are well known and are not the essential points in the present invention.

As a method of taking the spectacles frame image, i.e. to provide the first magnification, there can be mentioned, for example, a method whereby the light is positioned at the back side of a spectacles frame, such that only the shape of the frame is first detected from the difference between the luminance of the spectacles frame and the luminance of the background, next, the light is positioned at the front side of the frame, then the color information of the frame is obtained, and the frame shape information and the frame color information are multiplexed, thereby obtaining a single spectacles frame data. There can be also mentioned a method whereby the image of the spectacles frame photographed by the video camera is displayed by the display apparatus, the outer and inner peripheries of this spectacles frame image are traced by use of a pointing device such as mouse, light pen, digitizer, etc., and thereby allowing area between the outer and inner peripheries to be recognized as the spectacles frame. However, a method disclosed hereinbelow per the present invention is the most preferable since a clear spectacles frame image can be taken. Practically speaking, in place of the person's image, a constitution of the spectacles frame photographing apparatus is added to the system of the present invention. Namely, this preferable method is characterized in that: from the still image taken in the computer by the imaging apparatus with respect to the spectacles frame provided in the spectacles frame photographing apparatus, the values of R, G, and B of each dot in this still image are scanned in response to the commands input by the operating means of the computer; the spectacles frame data is separated from the background when the spectacles frame is photographed; and only the spectacles frame data is stored into the spectacles frame data memory.

Namely, the image pickup signal of the spectacles frame is transmitted through the A/D converter and stored into the image memory. This image pickup signal is transmitted through the D/A converter and displayed as a still image by the display apparatus.

The spectacles frame is set onto the frame base by a nose pad and ear hook portions. The frame base is always disposed at a fixed position. The video camera is also fixed to a predetermined position of the spectacles frame photographing apparatus. Therefore, the spectacles frame photographed is always displayed within a predetermined range around the designated position of the display apparatus as a reference point. On the other hand, the lens for the video camera is a fixed focus lens. Since the positional relation between the spectacles frame and the video camera is always constant as mentioned above, the spectacles frame photographed is always taken in at a constant magnification. Of course, one can obtain information on the distance between the frame and the camera.

The spectacle frame photographing apparatus comprises an outer box, an illuminating lamp, a diffuser, a black box, and a frame base. The spectacles frame to be photographed is set onto the frame base disposed in the black box in a manner such that only the front portion of the frame is located out of the black box and the temple portion is arranged in the black box.

When the frame is illuminated from the front side thereof in this state and the frame is photographed by the video camera, the difference between the brightness of the front portion of the frame and the luminance of the inside of the black box is pronounced, so that the frame and the background can be easily discriminated or distinguished from each other. On the other hand, since the temple portion is disposed in the black box, it is matched with the black area of the background, so that it is eliminated from the spectacles frame data.

Figure 8:
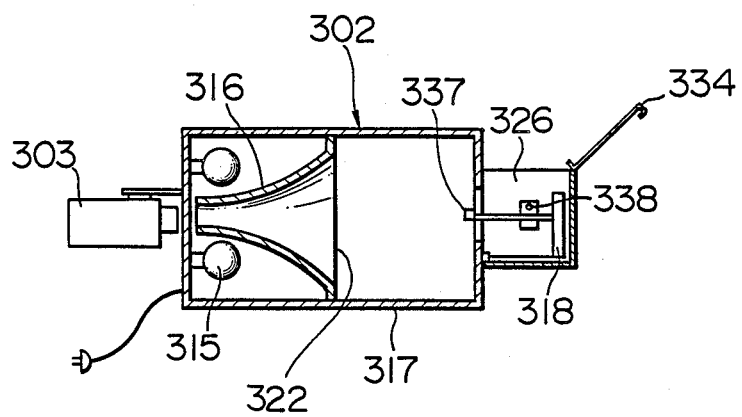
FIG. 8 is a plan view of an embodiment of a spectacles frame photographing apparatus.

As such a spectacles frame photographing apparatus, an apparatus having a constitution as shown in FIG. 8 can be used in practice.

A spectacles frame photographing apparatus 302 comprises an outer box 317, an illuminating lamp 315, a diffuser 316, a black box 326, and a frame base 318.

FIG. 9 shows a exploded view of the apparatus 302. In the diagram, a camera attaching plate 320 is attached as camera fixing means to the outer box 317 through a camera attaching base 321 in the direction perpendicular to an illuminating portion attaching plate 319 as a right end surface. Joint devices 320b each having a through hole 320a are formed at the edge on the attaching side of the camera attaching plate 320. The joint devices 320b come into engagement with joint projections 319$b_1$ and 319$b_2$ formed near the upper portion of a camera lens nozzle 319a formed in the central portion of the illuminating portion attaching plate 319, so that the plate 320 is fixed to the plate 319. A camera 303 is put on the attaching plate 320. The lens of the camera can be inserted into the camera lens nozzle 319a.

The illuminating portion attaching plate 319 to which the camera attaching plate 320 is coupled has four screw holes 319c at four corners. The plate 319 is attached to the outer box 317 by screws through the screw holes 319c at four corners. Joint members 320d to fix the illuminating device to the right and left edge surfaces are formed on the side which comes into contact with the inner wall of the outer box. Four illuminating lamps 315 as the light sources of the illuminating means are attached to the joint members 320d of the illuminating portion attaching plate 319.

A frame 322 is provided in the central portion between the right and left edge surfaces of the outer box 317. The horn-shaped diffuser 316 made of a milky acrylic resin is screwed into the frame 322. A black box window plate 323 is also screwed to the left edge surface of the outer box 317. Therefore, the space portion in the outer box 317 is separated into a direct illuminating space between the illuminating portion attaching plate 319 and the diffuser 316 and an indirect illuminating space between the diffuser 316 and the black box window plate 323.

The whole surface of an inner wall 317b of the outer box is covered by the same acrylic resin as that of the diffuser.

Therefore, since the diffuser 316 is used as a light diffusing device and the inner wall of the outer box is covered by the acrylic resin, the illuminating light transmits through the diffuser 316 and reaches the black box window plate, so that it is used as an omnidirectional indirect illuminating light.

A lighting window 324 is formed in the central portion of the black box window plate 323. The illuminating light transmits through this window 324. Black box attaching metal fittings 325a, 325b, and 325c are formed in the black box window plate 323 along the respective sides of the lighting window in the left, right, and upper portions thereof.

The black box 326 is assembled by a black box main body portion 327 and a black box door portion 328. The front surface of the main body portion 327 on the side opposite to the black box window plate is open.

A brush-shaped or bristle-type black blanket is adhered to the whole surface of the inner wall of the black box.

Figure 10:
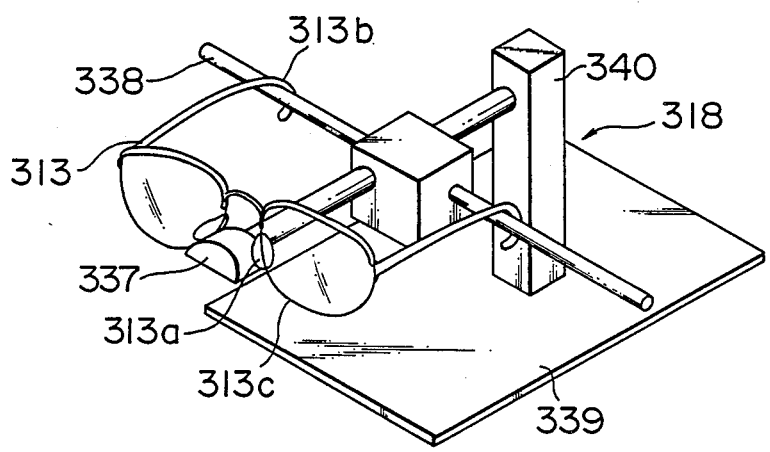
FIG. 10 is a perspective view of a frame base of the photographing apparatus in FIG. 8.

It is preferable that the frame base which is fixed to the black box is constituted as shown in, e.g., FIG. 10; however, it is not limited to this constitution. In the frame base shown in FIG. 10, the frame base 318 which is fixed to the bottom portion of the black box will now be described. This frame base is constituted as shown in FIG. 10. Namely, a spectacles frame 313 is fixed to the frame base 318 by a nose pad 313a and the ear hooks or side piece temples 313b. A nose pad base 337 of the frame base 318 has a semicircular shape. When the nose pad 313a is put on the nose pad base 337, the center of the nose pad automatically coincides with the center of the nose pad base. Ear hook sticks (temple supporting sticks) 338 are disposed at a position which is higher by about 8 mm than the center in the vertical direction of the nose pad base and which is backward by about 80 mm relative to the edge of the nose pad base. This positional relation is determined so as to correspond to the average position which is generally used when a person wears a spectacles frame. Therefore, by merely putting the spectacles frame onto the frame base, the same positional relation as that in the case where a person with a normally proportioned face wearing various kinds of frames is derived. The frame base is assembled and its upper plate 334 can be freely opened and closed. The frame base or spectacles frame is put into or taken out from the black box through the upper plate 334.

A brush-shaped or bristle-type black blanket is also adhered to the whole surface of each portion of the frame base.

According to this method, a clear spectacles frame image can be taken.

The program to make a synthetic image of a person and the frame is stored in the program memory 9, which will be explained hereinbelow. This program is read out as necessary. It is desirable that the capacity of the image memory 5 is set to a capacity such that the person's image and the spectacles frame image can be displayed in display apparatus 12 by the natural color and shape (contour). If the capacity is small, the clearness of the display image is poor. (In this embodiment, eight bits are used for each color.)

On the other hand, since the display screen of the display apparatus 12 is constituted by a set of dots (in this embodiment, 480 dots 0.37 mm/dot in the vertical direction, 640 dots 0.37 mm/dot in the horizontal direction), the memory address in the computer and the content of the color (R, G, B) are distributed at every dot.

Namely, the component of R, G, and B shows each luminance level and represents one color as a single vector. The steps of the luminance level are decided by the number of bits of the computer. For example, in the case where each of the R, G, and B colors consists of eight bits, $2^8 = 256$ steps can be set for one color. The number of combinations of three colors is $256^3 = 16,777,216$. Namely, a system capable of expressing 16,777,216 kinds of colors is provided.

On the other hand, in the display apparatus, the luminance of each of the electron guns for R, G, and B is individually controlled by the voltage.

The operating means 10 comprises a keyboard to input the IPD or the name of the type of frame data or the like and a touch panel to input the coordinate position on the display screen.

In this embodiment, a transparent touch panel of the resistive film type is used as the touch panel. The touch panel is constituted in such a manner that in order to detect the touch, conducting wires made of transparent resistive films are adhered like a lattice to two combined polyester sheets and these sheets are attached to the screen of the display apparatus. In general, the polyester sheets are disposed away from each other. When these sheets are pressed by a finger, either one of the cross points of a number of crossing conducting wires is made conductive, so that this conductive contact point is detected.

As a system of detecting the position by the touch panel, a capacitive system, acoustic system, optical system, and the like can be mentioned. In addition to the touch panel system, for example, a system using a light pen or the like can be used as the input means from the display screen. The input means is not limited to the input means shown in the embodiment. Other input means can be also used as the input means.

Therefore, with the constitution shown in FIG. 1, the present invention provides a method of forming a synthetic image in a simulation system for attachment of spectacles characterized by the steps of: calculating a said second magnification of the display image on the display screen of an actual person, on the basis of the coordinates of the positions of the apexes of the corneas of both of the right and left eyes which are detected from a still image on the display screen of a person who does not wear a pair of spectacles which is picked up by the video camera and is transmitted to the computer, and on the basis of the information of the distance between the pupils of the person which is input from the operating means of the computer; calculating the spectacles frame synthetic position on the display screen and a synthetic magnification of the person's image and spectacles frame image on the basis of the magnification; and displaying the synthetic image of the person and spectacles frame by the display apparatus.

Figure 3:
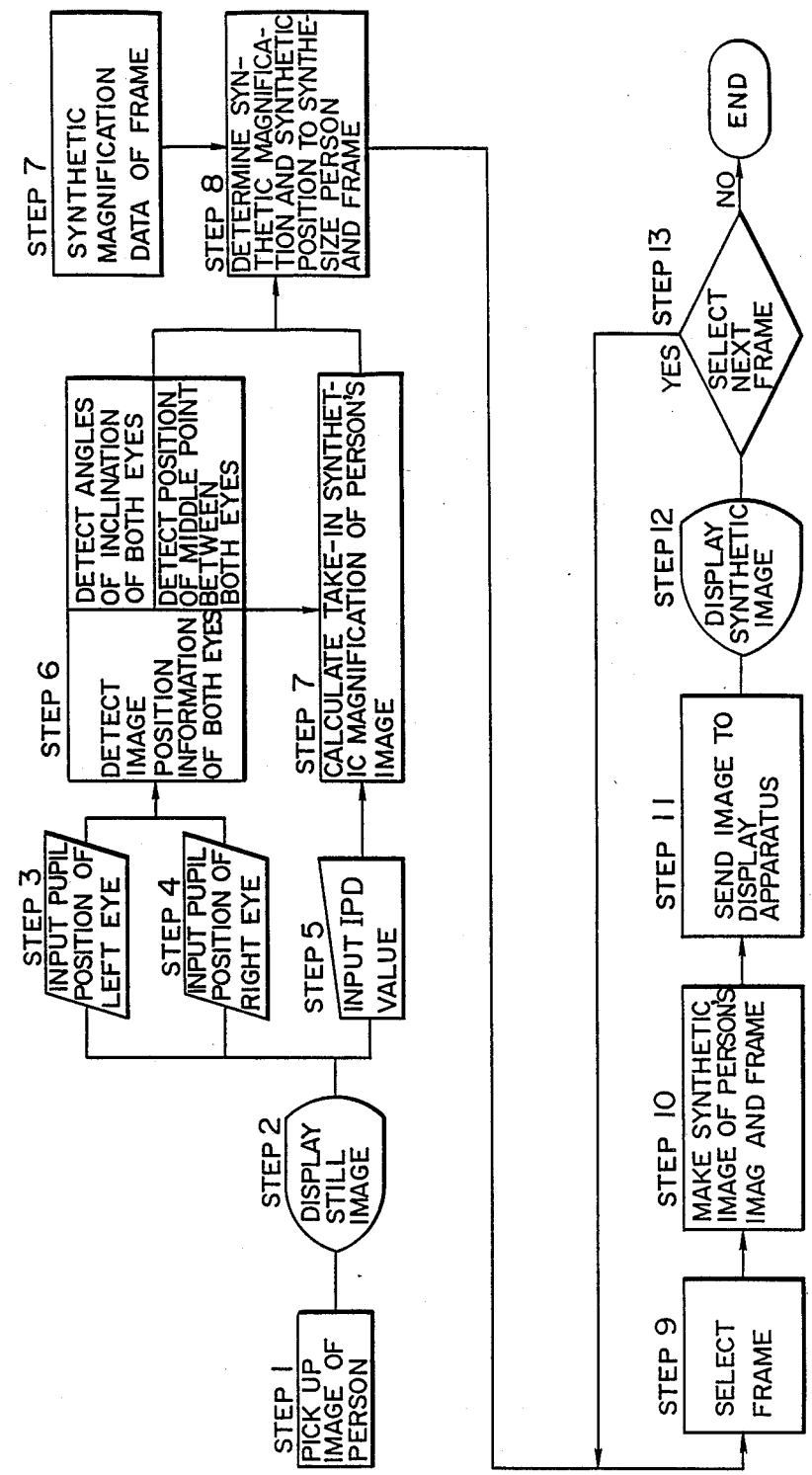
FIG. 3 is a diagram showing a flowchart for the operation of the spectacles simulation system in this embodiment.

A practical method will now be described in detail hereinbelow with reference to a flowchart of FIG. 3.

(Steps 1 to 2)

The image of the person 2, i.e. for providing the second magnification, is picked up by the video camera 3 and is displayed as the still image on the display screen. An image of this person is picked up without limiting it to a special position on the display screen and a photographing magnification of a special size. Namely, the person's image is picked up in the state of a constant still, natural, and relaxed face. The image pickup signal from the video camera is transmitted through the computer unit and displayed as a still image by the display apparatus.

(Steps 3 to 4)

Next, the coordinates $(X_L, Y_L)$ of the position of the apex of the cornea of the left eye of the person's image on the display screen and the coordinates $(X_R, Y_R)$ of the position of the apex of the cornea of the right eye are input to the computer by the input means using the touch panel.

(Step 5)

The data (the unit is mm) of the IPD value as the actual measured value of the person is input by the keyboard as the operating means of the computer. The IPD data has preliminarily actually been measured by a measuring instrument which measures the distance between the pupils (e.g., RC-810 made by HOYA Co., Ltd.). In the case of the RC-810 instrument, the IPD value is measured in the following manner. Namely, the distance for observation is set. The operator grasps the RC-810 instrument. The nose pad is placed on the nose of the person to be measured. The operator instructs him to observe the luminescent spot, while moving the slider to match the luminescent spots on the corneas of the person to be measured with the measuring line. In this way, the distance between the apexes of the corneas of the right and left eyes (in the case of the measurement of both eyes) or the distance between the central position of the nose and the apex of the cornea of one eye is measured.

On the other hand, the IPD value can be also measured by use of a scale or the like.

(Steps 6 to 8)

The position information of the images of both eyes is detected. Namely, the angles of inclination to both eyes of the horizontal directions of the screen and the central positions of both eyes are detected. The position coordinates of both of the right and left eyes on the display screen can be easily obtained from the input means on the basis of the numbers of dots in the X and Y directions on the screen as mentioned above. Therefore, the inclination $\theta$ of the straight line connecting the apexes (positions) of the corneas of the right and left eyes to the X direction (horizontal direction) of the display apparatus is derived by the following equation from those data.

$$\theta = \tan^{-1}\left(\frac{Y_R - Y_L}{X_R - X_L}\right) \quad (1)$$

Next, in order to synthesize the spectacles frame with the display image of the person, the inclination of the spectacles frame image must be also made coincident with that of the display image of the person. This inclination has already been calculated according to the equation (1). The rotational central reference for rotation of the image synthesis can be obtained by calculating the middle point (central coordinates) $(X_0, Y_0)$ of the coordinates of the positions of the apexes of the corneas of the right and left eyes. The central coordinates are derived as follows.

$$X_0 = \frac{X_R + X_L}{2}, \quad Y_0 = \frac{Y_R + Y_L}{2} \quad (2)$$

The take-in second magnification $(m_1)$ of the person's image is derived from the ratio of the actual measured value of the IPD and the distance between the right and left eyes on the display screen.

$$m_1 = \frac{IPD}{\sqrt{(X_R - X_L)^2 + (Y_R - Y_L)^2}} \quad (3)$$

(Step 9)

The third synthetic magnification (m) to form the synthetic image of the person and frame is obtained as follows since the take-in first magnification ($K_F$ [mm/dot]) of the frame data has previously been calculated as a fixed value.

$$m = \frac{IPD}{\sqrt{(X_R - X_L)^2 + (Y_R - Y_L)^2}} \cdot \frac{1}{K_F} \quad (4)$$

On the other hand, the synthetic position information of the frame data is derived by the equations (1) and (2). Therefore, these image synthesizing methods are programmed and stored in the program memory. Accordingly, the third synthetic magnification and synthetic position of the frame to make the synthetic image of the person and frame are sequentially decided by use of the equations (1) to (4) on the basis of the input data of the coordinates of the positions of the apexes of the corneas and the actual value of the IPD.

(Steps 9 to 13)

A proper frame can be selected from the frames drawn in a catalog or the like or the actual frames or the like. These frames are preliminarily registered as the frame data in the computer. Therefore, the numerical value data indicative of the type or the like can be read out by operating the keyboard or the like. Further, the process to form the synthetic image of the person and frame is performed. The synthetic image is sent to the display apparatus and displayed.

Until a desired frame is determined, the frame data is continuously input for selecting the proper frame.

The fundamental flow has been described above. For example, it is also possible to change the color of face of the person's image to simulate the state of sunlight, or to change the color of lens being simulated, by use of well-known image synthesizing techniques.

(Embodiment 2)

Figure 4:
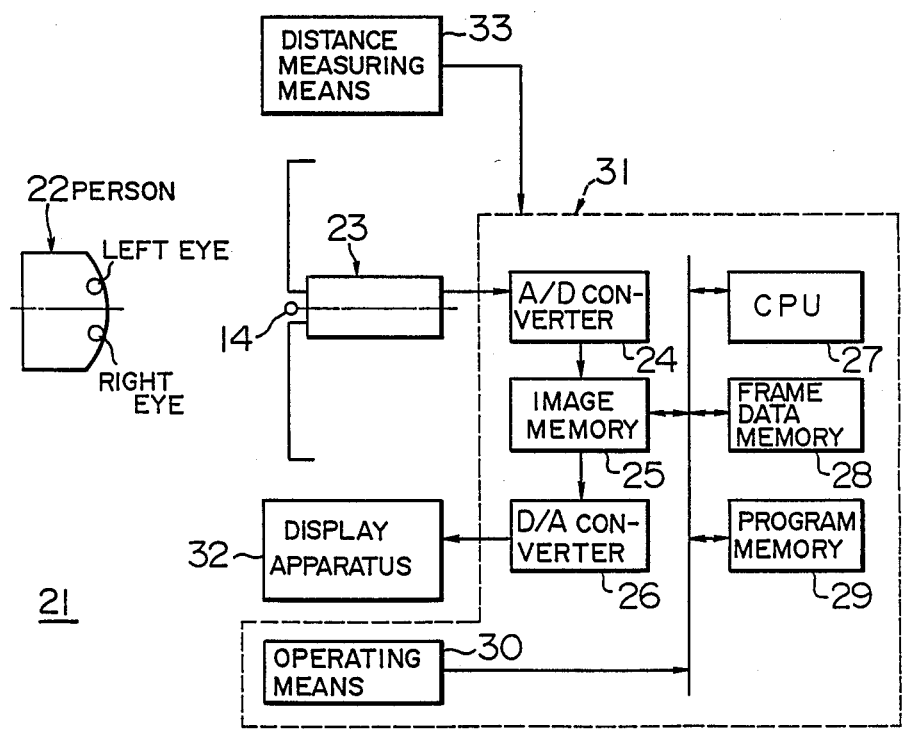
FIG. 4 is a diagram for explaining a constitution of a spectacles simulation system in the embodiment 2.

In FIG. 4, a simulation system 21 for attachment of spectacles comprises: a video camera 23 to pick up an image of a person 22; a computer unit 31; a display apparatus 32; and distance measuring means 33. The computer unit 31 comprises: an A/D converter 24; an image memory 25; a D/A converter 26; a CPU 27; a frame data memory 28; a program memory 29; and operating means 30.

In this embodiment, since it is the distance measuring means 33 itself which differs from the embodiment 1 with respect to the constitution and its synthesizing method and the like, only the different portions will now be described in detail.

In this embodiment, well-known distance measuring means can be used as the distance measuring means 33. The method of measuring the distance is not particularly limited but a distance measuring method shown in, e.g., FIG. 6 or 7 is preferable.

Figure 6:
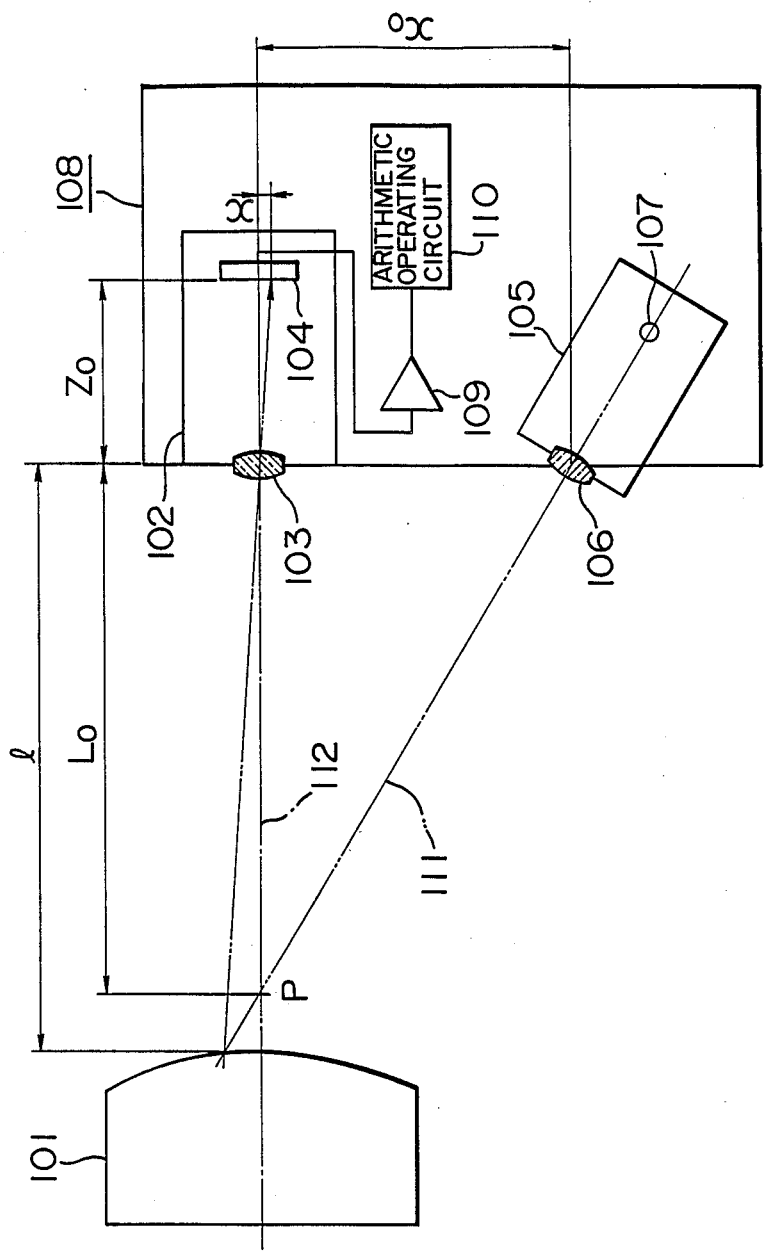
FIGS. 6, 7A, and 7B are diagrammatical views showing distance measuring methods.

In FIG. 6, for a person's face 101, the distance measuring apparatus 108 comprises: a light receiving apparatus 102 consisting of a light receiving lens 103 and a photo sensor 104; a light projecting apparatus 105 consisting of a light projecting lens 106 and a light source 107; and a calculating section consisting of a waveform shaping circuit 109 and an arithmetic operating circuit 110.

By adjusting the distance between the light projecting lens 106 and the light source 107, an irradiation light 111 emitted from the light projecting apparatus 105 is irradiated onto the face 101 like a spot or line. Then, the irradiated position can be measured by the light receiving apparatus 102. Namely, the irradiated position can be measured by moving the light receiving lens 106 such that the spot image irradiated onto the face 101 can be formed onto the photo sensor 104 of the light receiving apparatus 102. In the light receiving apparatus 102, the signal from the photo sensor 104 is supplied to the waveform shaping circuit 109 and its waveform is shaped. The distance l between the distance measuring apparatus 108 and the person's face 101 is calculated as follows by the arithmetic operating circuit 110 on the basis of an image position x on the photo sensor 104 from an optical axis 112.

$$l = \frac{x_0 z_0}{x_0 z_0 - L_0 x} \cdot L_0$$

Here, $x_0$ denotes a distance between the light projecting lens 106 and the optical axis 112, $z_0$ a distance between the light receiving lens 103 and the photo sensor 104, and $L_0$ a distance between a point P at which the irradiation light 111 intersects the optical axis 112 and the light receiving lens 103.

A CCD, PSD, or the like can be used as the photo sensor 104.

Figure 7A:
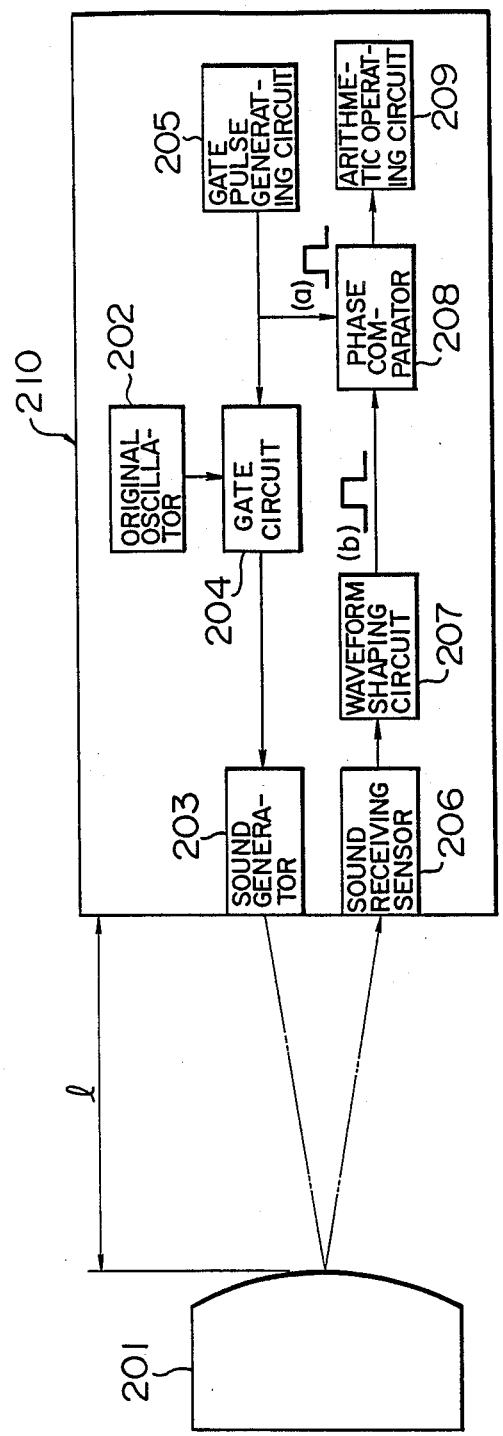

FIG. 7A shows a constitution of a distance measuring apparatus 210 in which a sound generator 203 is enclosed. The apparatus 210 comprises: an original oscillator 202; the sound generator 203; a gate circuit 204; a gate pulse generating circuit 205; a sound receiving sensor 206; a waveform shaping circuit 207; a phase comparator 208; and an arithmetic operating circuit 209.

In FIG. 7A, a continuous signal from the original oscillator 202 is input to the gate circuit 204. This signal is made intermittent by gate pulses generated from the gate pulse generating circuit 205. The intermittent signal is input to the sound generator 203, so that an intermittent sound is generated.

The sound wave generated from the sound generator 203 collides with a person's face 201 and is reflected. The reflected sound wave is input to the sound receiving sensor 206.

The signal from the sensor 206 is waveform shaped by the waveform shaping circuit 207 and input to the phase comparator 208.

Figure 7B:
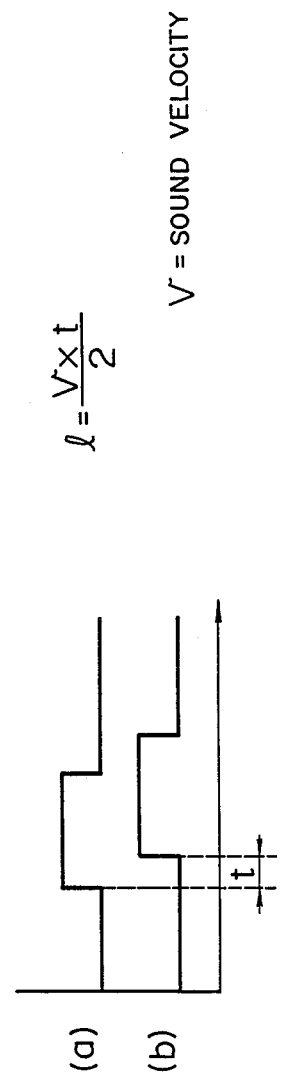

As shown in FIG. 7B, the phase comparator 208 compares the gate pulses (a) from the gate pulse generating circuit 205 with the signal (b) from the waveform shaping circuit 207 and outputs a phase difference t.

The phase difference t is input to the arithmetic operating circuit 209. The distance between the distance measuring apparatus 210 and the person's face 201 is calculated by the following equation.

$$l = \frac{v \cdot t}{2} \text{ (v is a sound velocity in the air.)}$$

Figure 5:
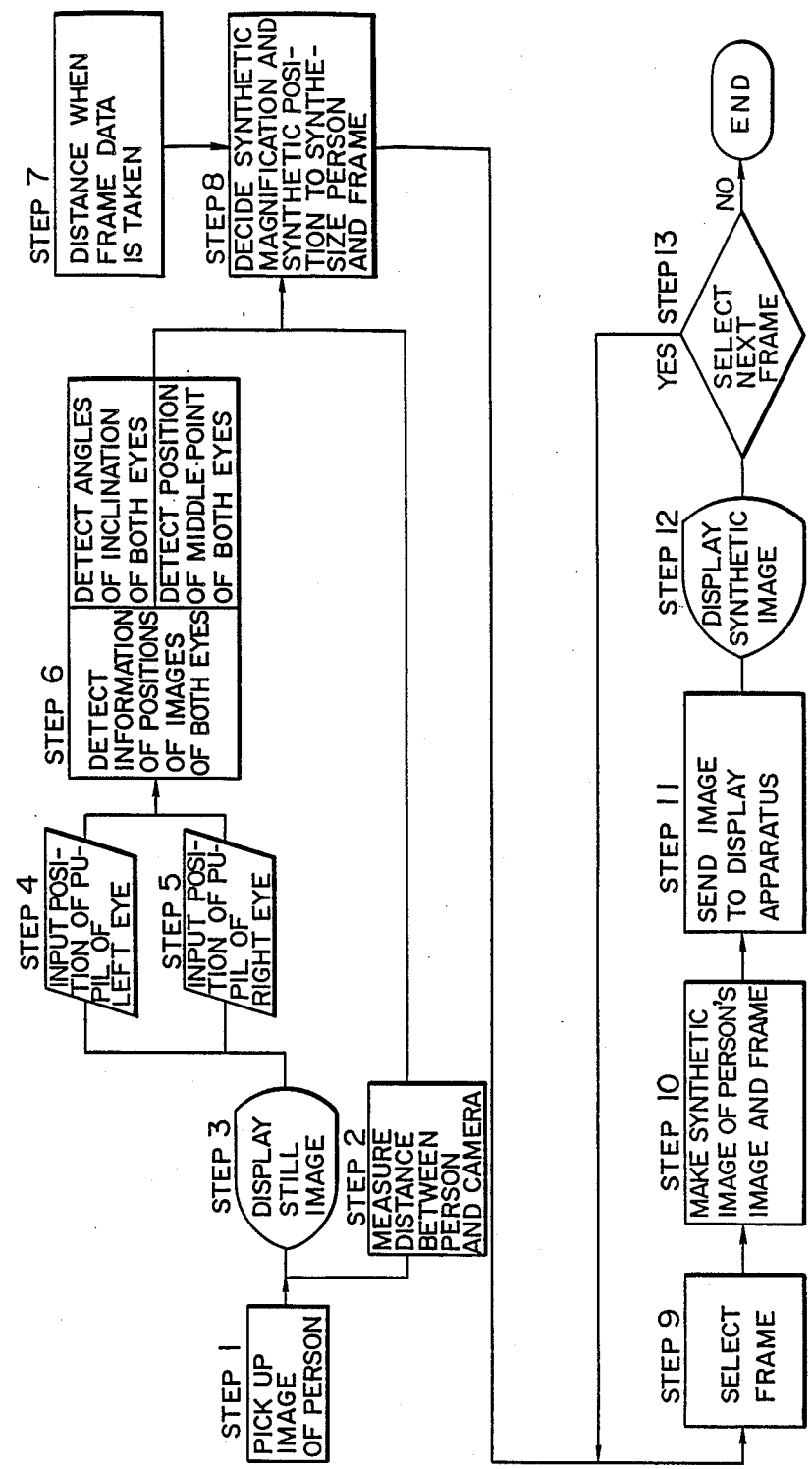
FIG. 5 is a diagram showing a flowchart for the operation of the spectacles simulation system in this embodiment.

A practical method of measuring the distance will now be described in detail hereinbelow with reference to a flowchart in FIG. 5.

(Steps 1 to 3)

An image of the person, i.e. for providing the second magnification 22 is picked up by the video camera 23 and displayed as a still image on the display screen. This person's image is picked up without limiting it to a special position on the display screen and to a photographing magnification of a special size. Namely, the person's image is picked up in the constant, still, natural, and relaxed face condition. The image pickup signal from the video camera is transmitted through the computer unit and displayed as a still image by the display apparatus.

The distance (l) between the person 22 and the camera 23 is measured by the distance measuring means.

(Steps 4 to 5)

Next, the coordinates ($X_L$, $Y_L$) of the position of the apex of the cornea of the left eye and the coordinates ($X_R$, $Y_R$) of the position of the apex of the cornea of the right eye of the person's image on the display screen are input to the computer by the input means by use of the touch panel.

(Steps 6 to 8)

The information of the positions of the images of both eyes is detected and the synthetic magnification of the frame and person is determined. Namely, the angles of inclination to the horizontal direction of the screen of both eyes are detected. The central positions of both eyes are detected. The position coordinates of both of the right and left eyes on the display screen can be easily obtained on the basis of the numbers of dots in the X and Y directions on the screen by use of the input means as mentioned above. Therefore, the inclination $\theta$ of the straight line connecting the apexes (positions) of the corneas of the right and left eyes to the X direction (horizontal direction) of the display apparatus is derived as follows on the basis of those data.

$$\theta = \tan^{-1}\left(\frac{Y_R - Y_L}{X_R - X_L}\right) \tag{1}$$

Next, in order to synthesize the spectacles frame with the display image of the person, the inclination of the spectacles frame image must be also made coincident with the inclination of the display image of the person. This inclination has already been calculated by the equation (1). The rotational central reference for rotation of the image synthesis can be derived by obtaining the middle point (central coordinates) ($X_0$, $Y_0$) of the coordinates of the positions of the apexes of the corneas of the right and left eyes. The central coordinates are calculated as follows.

$$X_0 = \frac{X_R + X_L}{2}, Y_0 = \frac{Y_R + Y_L}{2} \tag{2}$$

The synthetic magnification (m) to make the synthetic image of the person and frame is obtained by the following equation (3) since the distance (L) between the frame and the camera when the frame data is taken in has previously been calculated as the fixed value by the distance measuring means.

$$m = L/l \tag{3}$$

On the other hand, the synthetic position information of the frame data is obtained by the equations (1) and (2). Therefore, these image synthesizing methods are programmed and stored in the program memory. Therefore, the synthetic magnification and synthetic position of the frame to make the synthetic image of the person and frame are sequentially decided by the equations (1), (2), and (5) on the basis of the coordinates of the positions of the apexes of the corneas and the second magnification by the distance measuring means.

(Steps 9 to 13)

A preferable frame can be selected from the frames drawn on a catalog or the like or the actual frames or the like. Since these frames have previously been registered as the frame data in the computer, the numerical value data of the type or the like can be read out of the computer by operating the keyboard or the like. Further, the process to make the synthetic image of the person and frame is performed and the synthetic image is sent to the display apparatus and displayed.

Until a desired frame is determined, the frame data is continuously input for selecting the proper frame.

The fundamental flow has been described above. In a manner similar to the embodiment 1, for example, it is also possible to change the color of the face of the person's image to simulate the state of sunlight or to change the color of the lens being simulated, by use of well-known image synthesizing technique.

According to the present invention, it is sufficient that the person who removed the spectacles to be image picked up merely observes a target. There is no need to pay attention to the position and inclination of the face. Therefore, a personal operator as in the conventional system is unnecessary and the system can be operated by only the person himself to be measured. In addition, since the synthetic image can be correctly formed at an arbitrary screen size, the person's image can be picked up at the screen size in accordance with the object of use. On the other hand, the spectacles frame can be synthesized at the correct position, size, and inclination. Thus, the difference between the impression of the synthetic image and the impression when the person wear the actual frame can be reduced. Further, the data such as those of eye point positions on the spectacles frame or the like which are necessary to process the lens of the spectacles can be easily measured with high accuracy.

We claim:

1. A method of forming a synthetic image, in a simulation system for attachment of spectacles which comprises: a computer having a CPU, an A/D converter, an image memory, a D/A converter, a frame data memory of spectacles frame data taken in at a first magnification, a program memory, and operating means; an imaging apparatus; and a display apparatus, and in which a synthetic image of the image pickup data of the spectacles frame taken in at the first magnification and the image pickup data of a person's image derived from the imaging apparatus is made by the computer, and a state in which the person wears a pair of spectacles is displayed by the display apparatus, said method comprising the steps of:

calculating a second magnification of the display image on the display screen of an actual person, on the basis of the coordinates of the positions of the apexes of the corneas of both of the right and left eyes which are detected from a still image on the display screen of a person who does not wear a pair of spectacles which is picked up by the imaging apparatus and is transmitted to the computer, and on the basis of the information of the distance between the pupils of the person which is input from the operating means of the computer;

calculating the spectacles frame synthetic position on the display screen and a third synthetic magnification of the person's image and spectacles frame image on the basis of the second magnification; and displaying the synthetic image of the person and spectacles frame by the display apparatus.

2. A method of forming a synthetic image, in a simulation system for attachment of spectacles which comprises: a computer having a CPU, an A/D converter, an image memory, a D/A converter, a frame data memory of spectacles frame data taken in at a first magnification, a program memory, and operating means; an imaging apparatus; a display apparatus; and distance measuring means, and in which a synthetic image of the image pickup data of the spectacles frame taken in at the first magnification and the image pickup data of a person's image derived from the imaging apparatus is made by the computer, and a state in which the person wears a pair of spectacles is displayed by the display apparatus, said method comprising the steps of:

calculating a second magnification of the display image on the display screen of an actual person, on the basis of the coordinates of the positions of the apexes of the corneas of both of the right and left eyes which are detected from a still image on the display screen of a person who does not wear a pair of spectacles which is picked up by the imaging apparatus and is transmitted to the computer, and on the basis of the information of the distance between the person and the imaging apparatus which is measured by the distance measuring means;

calculating the spectacles frame synthetic position on the display screen and a third synthetic magnification of the person's image and spectacles frame image on the basis of the second magnification; and displaying the synthetic image of the person and spectacles frame by the display apparatus.

* * * * *